United States Patent
Palmer et al.

(10) Patent No.: US 7,419,630 B2
(45) Date of Patent: Sep. 2, 2008

(54) METHODS AND SYSTEMS FOR RAPID PROTOTYPING OF HIGH DENSITY CIRCUITS

(75) Inventors: Jeremy A. Palmer, Albuquerque, NM (US); Donald W. Davis, Albuquerque, NM (US); Bart D. Chavez, Albuquerque, NM (US); Phillip L. Gallegos, Albuquerque, NM (US); Ryan B. Wicker, El Paso, TX (US); Francisco R. Medina, El Paso, TX (US)

(73) Assignee: Sandia Corporation, Albuquerque, NM (US)

( * ) Notice: Subject to any disclaimer, the term of this patent is extended or adjusted under 35 U.S.C. 154(b) by 748 days.

(21) Appl. No.: 10/907,979

(22) Filed: Apr. 22, 2005

(65) Prior Publication Data

US 2006/0237879 A1    Oct. 26, 2006

(51) Int. Cl.
*B29C 35/04* (2006.01)
(52) U.S. Cl. .................. 264/401; 264/603; 264/255
(58) Field of Classification Search ........... 425/174, 425/375; 264/401, 603, 255
See application file for complete search history.

(56) References Cited

U.S. PATENT DOCUMENTS

| | | | |
|---|---|---|---|
| 4,575,330 A | 3/1986 | Hull | |
| 5,088,047 A | 2/1992 | Bynum | |
| 5,398,193 A | 3/1995 | deAngelis | |
| 5,510,066 A | 4/1996 | Fink et al. | |
| 5,786,023 A | 7/1998 | Maxwell et al. | |
| 5,902,538 A | 5/1999 | Kruger et al. | |
| 6,027,699 A | 2/2000 | Holcomb et al. | |
| 6,153,034 A | 11/2000 | Lipsker | |
| 6,158,346 A | 12/2000 | Zhang | |
| 6,159,411 A | 12/2000 | Kulkarni et al. | |

(Continued)

FOREIGN PATENT DOCUMENTS

EP    1245369    2/2002

(Continued)

OTHER PUBLICATIONS

A. Piqué and D.B. Chrisey, editors, Direct-Write Technologies for Rapid Prototyping Applications (Academic Press, San Diego, CA, 2002).*

(Continued)

*Primary Examiner*—Sam Chuan Yao
*Assistant Examiner*—David N Brown, II
(74) *Attorney, Agent, or Firm*—Gardere, Wynne, Sewell LLP; William R. Conley

(57) ABSTRACT

A preferred embodiment provides, for example, a system and method of integrating fluid media dispensing technology such as direct-write (DW) technologies with rapid prototyping (RP) technologies such as stereolithography (SL) to provide increased micro-fabrication and micro-stereolithography. A preferred embodiment of the present invention also provides, for example, a system and method for Rapid Prototyping High Density Circuit (RPHDC) manufacturing of solderless connectors and pilot devices with terminal geometries that are compatible with DW mechanisms and reduce contact resistance where the electrical system is encapsulated within structural members and manual electrical connections are eliminated in favor of automated DW traces. A preferred embodiment further provides, for example, a method of rapid prototyping comprising: fabricating a part layer using stereolithography and depositing thermally curable media onto the part layer using a fluid dispensing apparatus.

10 Claims, 5 Drawing Sheets

U.S. PATENT DOCUMENTS

| | | | |
|---|---|---|---|
| 6,179,601 B1 | 1/2001 | Kruger et al. | |
| 6,206,672 B1 | 3/2001 | Grenda | |
| 6,216,765 B1 | 4/2001 | Tseng et al. | |
| 6,242,163 B1* | 6/2001 | Stampfl et al. | 430/322 |
| 6,309,581 B1 | 10/2001 | Gervasi | |
| 6,391,251 B1 | 5/2002 | Keicher et al. | |
| 6,450,393 B1 | 9/2002 | Doumanidis et al. | |
| 6,623,687 B1 | 9/2003 | Gervasi et al. | |
| 6,630,093 B1 | 10/2003 | Jones | |
| 6,641,897 B2 | 11/2003 | Gervasi | |
| 7,277,770 B2* | 10/2007 | Huang | 700/121 |
| 7,351,321 B2* | 4/2008 | Cohen | 205/118 |
| 2002/0171178 A1 | 11/2002 | Dean et al. | |
| 2003/0017277 A1* | 1/2003 | Young et al. | 427/596 |
| 2003/0032733 A1 | 2/2003 | Fisher et al. | |
| 2003/0058605 A1* | 3/2003 | Keser | 361/508 |
| 2004/0006438 A1 | 1/2004 | Hastert et al. | |
| 2005/0054121 A1* | 3/2005 | Handy et al. | 438/3 |
| 2005/0272885 A1* | 12/2005 | Mirkin et al | 526/72 |
| 2006/0225834 A1* | 10/2006 | Medina et al. | 156/273.3 |
| 2006/0237879 A1* | 10/2006 | Palmer et al. | 264/401 |

FOREIGN PATENT DOCUMENTS

| | | |
|---|---|---|
| WO | WO 02/085246 | 10/2002 |
| WO | WO 03/002490 | 1/2003 |

OTHER PUBLICATIONS

Baldwin, Samuel P. et al; "Materials For Protien Delivery in Tissue Engineering", Advanced Drug Delivery Reviews 33, 1998 Elsevier Science B.V., p. 71-86.

Kataria Alok et al; "Building Around Inserts: Methods For Fabricating Complex Devices In Stereolithography" DETC00/MECH-14206; 2000 ASME, p. 1-11.

Maruo Shoji et al; Multi-Polymer Microstereolithography For Hybrid Opto-Mems; Department of Micro System Engineering, Nagoya University, 2001 IEEE, p. 151-154.

Lee Jim H. et al; "Cure Depth In Photopolymerization: Experiments and Theory", J. Mater. Res., vol. 16, No. 12, Dec. 2001; p. 3536-3544; 2001 Materials Research Society.

Hoffman Allan S.; "Hydrogels For Biomedical Applications", Advanced Drug Delivery Reviews 43 (2002); 2002 Elsevier Science B.V., Jul. 26, 2001, p. 3-12.

Cooke Malcolm N. et al; "Use of Stereolithography to Manufacture Critical-Sized 3D Biodegradable Scaffolds for Bone Ingrowth" 2002 Wiley Periodicals, Inc., Oct. 2001.

Liu Valerie A. et al; "Three Dimensional Photopatterning of Hydrogels Containing Living Cells", Hybrid Bio/Artificial Microdevices, Biomedical Microdevices 4:4; 2002 p. 257-26.

De Laurentis Kathryn J. et al; "Procedure For Rapid Fabrication Of Non-Assembly Mechanisms With Embedded Components" DETC 2002/MECH-34350; 2000 ASME, p. 1-7.

Hatanaka Motohide et al; "Process Planning For Embdding Flexible Materials in Multi-material Prototypes" DETC2003/DFM048166, 2003 ASME, p. 1-9.

Drury Jeanie L. et al; "Hydrogels For Tissue Engineering: Scaffold Design Variables and Applications", Science Direct, Biomaterials, 2003 Elsevier Ltd., p. 1-15.

Geving Brad et al; "Conceptual Design Of A Generalized Stereolithography Machine", The George W. Woodruff School of Mechanical Engineering, pp. 1-8.

De Laurentis Kathryn J. et al; "Rapid Fabrication of Non-Assembly Robotic Systems With Embedded Components", Robotics and Mechatronics Laboratory; Rutgers University, pp. 1-30.

* cited by examiner

METHODS AND SYSTEMS FOR RAPID PROTOTYPING OF HIGH DENSITY CIRCUITS

GOVERNMENT INTEREST STATEMENT

This invention was developed under Contract DE-AC04-94AL85000 between Sandia Corporation and the U.S. Department of Energy. The U.S. Department of Energy has certain rights to this invention.

BACKGROUND

The present invention relates to the general field of rapid prototyping (RP), and methods and systems of dispensing fluid media such as direct-write (DW) technologies.

RP technologies, also known as Solid Freeform Fabrication (SFF), layered manufacturing and other similar technologies enable the manufacture of complex three-dimensional (3D) parts. RP technologies, in particular, generally construct parts by building one layer at a time for use in, for example, the toy, automotive, aircraft and medical industries. Oftentimes prototypes made by RP technologies aid in research and development and provide a low cost alternative to traditional prototyping.

Stereolithography (SL) is one of the most widely used RP technologies known in the art. The resolution of SL machines and the ability of SL to manufacture highly complex 3D objects, make SL ideal for building both functional and non-functional prototypes. In particular, SL techniques provide economical, physical models of objects quickly prior to making more expensive finished parts. The models are readily customizable and changes may be easily implemented.

SL generally involves a multi-stage process. For example, the first stage involves designing and inputting a precise mathematical and geometric description of the desired structure's shape into one of many computer-aided design (CAD) programs and saving the description in the standard transform language (STL) file format. In the second stage, the STL file is imported into SL machine-specific software (RP software). The RP software slices the design into layers and determines the placement of support structures to hold each cross-section in place while building the structure layer by layer. By computing build parameters, the RP software controls the part's fabrication. In the layer preparation stage, the build parameters for the desired part are translated into machine language. Finally, the machine language controls the SL machine to build a desired part and its support structures layer by layer. SL machines typically focus an ultraviolet (UV) laser onto a cross-section of a liquid photopolymer resin. The laser, in turn, selectively cures a resin to form a structure, layer by layer. Ultimately, the part is cleaned, the support structure is removed and the part is post-cured (typically exposed to UV) prior to completion. Complex-shaped parts are thus manufactured by repeating the layering process.

Although RP technologies for complex functional parts and prototypes have greatly improved in recent years, there is still a need to improve RP technologies for building functional electromechanical parts. There is a further need for achieving significant reductions in size, mass and manufacturing cycle times of low voltage electrical systems. Most RP systems allow building cycle sequences to be interrupted, thus opening the possibility of encapsulating electromechanical components within the model structure. For example, some have demonstrated the feasibility of encapsulating sensors and actuators in metal and polymer structures using Shape Deposition Manufacturing (SDM). Others have demonstrated systems for automatic dispensing of conductive, thermally curable media, such as direct-write (DW) inks, for maskless patterning of electronics. Limitations in speed and feature size, however, have prevented the integration of RP and DW technologies and, consequently, its acceptance in, for example, the microelectronics industry. Recently, however, there have been several breakthroughs in DW ink dispensing for military applications which dispense advanced metallic inks through a hollow tip, precisely controlling the ink's flow and stopping points. These breakthroughs may lead to writing capabilities as small as 50 micrometers on curved substrates of various materials. Although there have been improvements in writing capabilities, many SL resins have been found to be incompatible with, for example, the high temperatures required to anneal DW inks.

What is desired is a system and method for automated deposition of fluid media during any RP processing, automated curing of the media (if necessary), encapsulation of the media and continued building without contamination or intermediate washing and/or curing. What is also desired are improvements in part building technology and, in particular, improvements in the integration of fluid media, such as DW inks, with RP technologies. Specifically, there is a need for low cost, efficient and easy to use RP processes that accommodate 3D DW ink dispensing technology to fabricate, for example, complex 3D, high density circuits that are rapidly manufactured, integrated and fully functional electromechanical systems. Such electromechanical systems should be compact, less expensive and more reliable than their conventional predecessors. Additionally, by removing heavy cables, redundancy can easily be designed into a structure where previously it could not be, thus allowing significant size and weight savings for sensitive applications such as those for aerospace and space applications.

What is further desired is a system and method for Rapid Prototyping High Density Circuit (RPHDC) manufacturing of solderless connectors and pilot devices with terminal geometries that are compatible with DW mechanisms and reduce contact resistance where the electrical system is encapsulated within structural members and manual electrical connections are eliminated in favor of automated DW traces.

SUMMARY OF THE INVENTION

The present invention overcomes the aforementioned limitations in an effective and efficient manner, and provides for expanded use of rapid prototyping (RP) in various applications and integrating fluid dispensing technologies such as direct-write (DW) technologies on subject parts built by RP.

A preferred embodiment provides, for example, systems and methods of combining DW technologies with stereolithography (SL). Accordingly, existing SL systems that fabricate a subject part layer by layer are combined with DW technologies that deposit whatever material required for a particular application. SL fabricated parts may now have, for example, complex three-dimensional (3D) embedded circuitry within the fabricated part by DW technology. Thus, the systems and methods disclosed herein provide for increased micro-fabrication and micro-stereolithography.

Another preferred embodiment provides, for example, rapid development of circuitry to manufacture more compact components that provide advantages such as weight savings, self-assembly components, rapid manufacturing, micro-fabrication, micro-stereolithography and micro-circuitry for aerospace, space, homeland security, national defense and a variety of other applications.

Still another preferred embodiment provides, for example, a system and method of integrating thermally curable media with SL without the need for intermediate washing, curing and/or drying. Thus, the systems and methods disclosed herein could easily be converted to make complex, 3D embedded circuitry, for example, without the addition of costly equipment.

Yet another preferred embodiment provides a system and method for Rapid Prototyping High Density Circuit (RPHDC) manufacturing of solderless connectors and pilot devices with terminal geometries that are compatible with DW mechanisms and reduce contact resistance where the electrical system is encapsulated within structural members and manual electrical connections are eliminated in favor of automated DW traces.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1A:
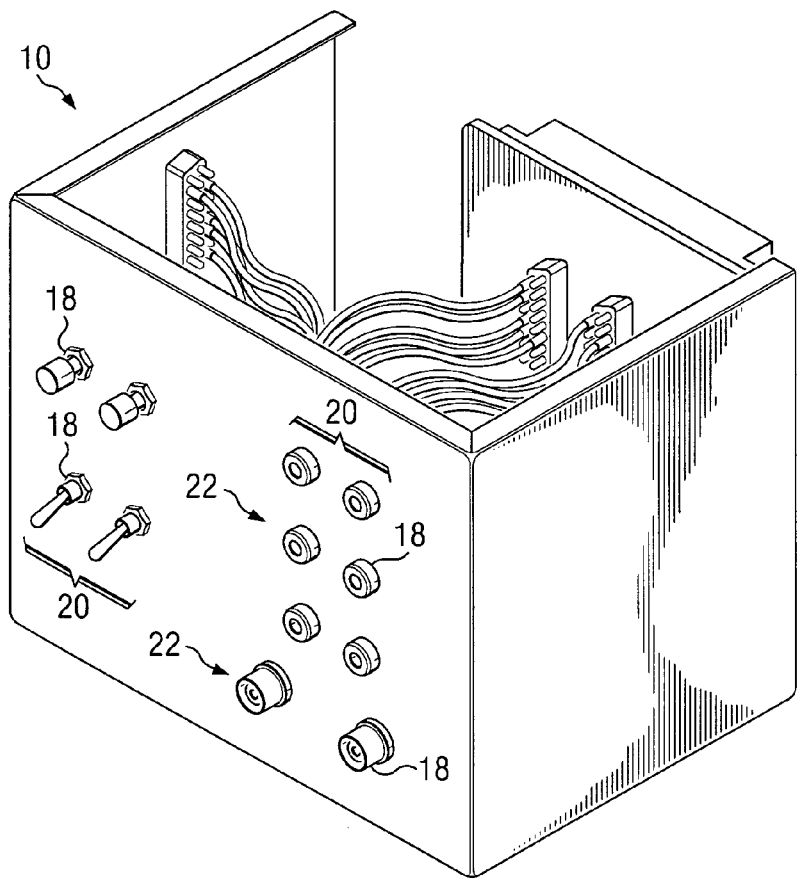
FIG. 1A is a perspective view of a low voltage distribution network containing junction boxes or load centers where bundles of conductors are routed to exposed terminals and pilot devices within an enclosure known in the art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Existing rapid prototyping (RP) systems are typically used for non-functional prototypes. A preferred embodiment of the present invention provides, for example, a system and method of integrating fluid media dispensing technology such as RP technologies with direct-write (DW) technologies. Accordingly, a preferred embodiment combines, for example, RP systems, such as those which use stereolithography (SL) which are capable of fabricating a part layer by layer, and DW technologies which are capable of depositing whatever material required for a particular application or circuit.

In accordance with a preferred embodiment of the present invention, single and multi-material RP fabricated parts may have, for example, complex three-dimensional (3D) embedded circuitry within the part deposited by DW technology. In accordance with a preferred embodiment, the fluid media is optionally cured. There are a variety of curing methods available to cure the fluid media and/or the RP building resin, including for example, a ultraviolet light source, a particle bombarder, a chemical sprayer, a radiation impinger, an ink jet, an oven, a fan, a pump, a curing device, a drying device that incorporates convection, conduction and/or radiation heat transfer and any combination thereof. The part may then be re-registered on the RP machine without contamination and the building processes can continue as desired.

One preferred embodiment of the present invention thus provides a system and method for Rapid Prototyping High Density Circuit (RPHDC) manufacturing of solderless connectors and pilot devices with terminal geometries that are compatible with DW mechanisms and reduce contact resistance where the electrical system is encapsulated within structural members. Additionally, manual electrical connections are eliminated in favor of automated DW traces. RPHDC enables, for example, paperless design processes, accelerated design-to-manufacturing processing times, the production of component interconnects by directly embedding conductive paths into the structure, and the protection external wiring harnesses and cable circuitry. The conductive paths may be designed of varying path width and depth, but may be traced in 3D.

In a preferred embodiment, RPHDC may begin by fabricating a subject part layer using RP. The subject part layer may be re-cured to ensure that is free from resin residue on the surface. To create encapsulated electrical paths on a subject part layer, the subject part may be placed on another apparatus equipped for DW technology. After the DW apparatus is initialized and calibrated, the DW apparatus deposits the desired interconnects and circuitry (or whatever other materials that are required for a particular application). After deposition, the subject part is taken out of the DW apparatus and thermally cured. The subject part may then be optionally allowed to cool (either actively or passively) sufficient enough to allow re-immersing the subject part into the RP resin to build the next layer. The subject part is placed back on to the RP system. The RP system is reregistered based on the original CAD model used to produce the subject part and continues to build the subject part's layers as desired. It should be understood by those skilled in the art that the subject part is typically registered on automated equipment. This process may be repeated as desired. The present invention thus facilitates multi-layer circuits by dispensing fluid media in such a manner as to provide a continuous conductive path between the subject part's layers. A simple example of systems and methods of a preferred embodiment is provided below.

EXAMPLE

Figure 1B:
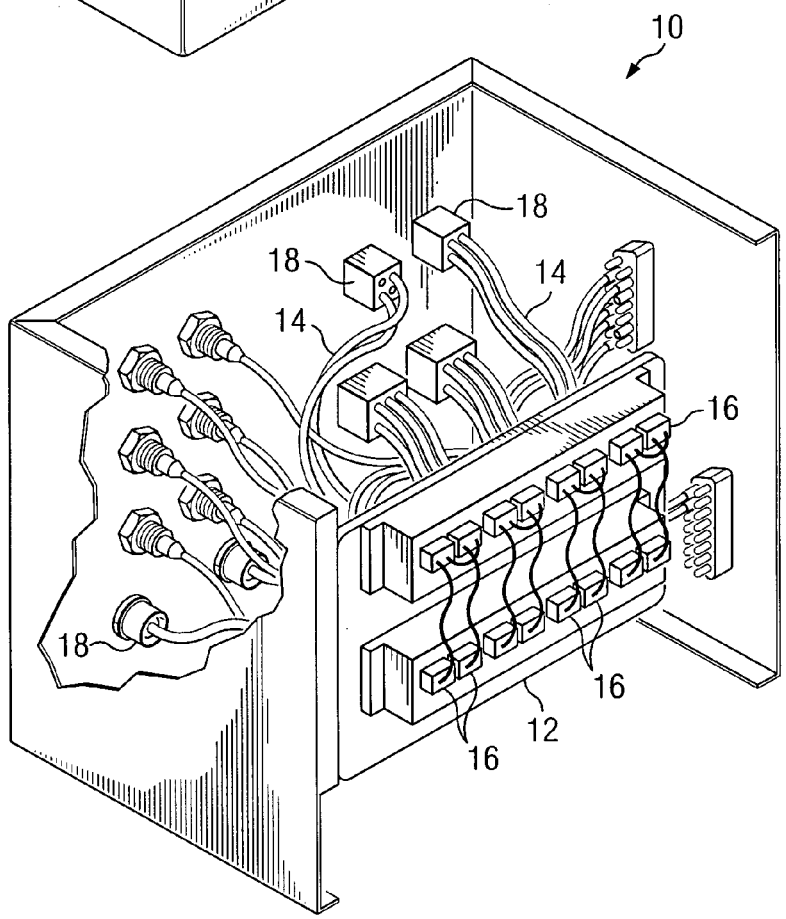
FIG. 1B is another perspective view of the prior art low voltage distribution network of FIG. 1A.

Modern low voltage distribution networks, for example, contain an enclosure 10 comprising junction boxes or load centers 12 where bundles of conductors 14 are routed to exposed terminals 16, as depicted for example in FIGS. 1A and 1B, and pilot devices (not shown). Such enclosures 10 must be designed to prevent unnecessary compression of the wiring which can lead to, for example, insulation failures and short circuits. Enclosures 10 known in the art are typically made from sheet metal and are relatively bulky in size. For example the network of load centers 12 and conductors 14 depicted in FIGS. 1A and 1B, may have signals typically ranging from 6 to 28 volts. The depicted network has load centers 12 and conductors 14 routed and switched to connectors 18 on three sides of the enclosure 10. For a network of this size and complexity, it is typical to utilize an enclosure 10 with dimensions of, for example, 12.7 cm.×15.2 cm.×10.2 cm.

Figure 2A:
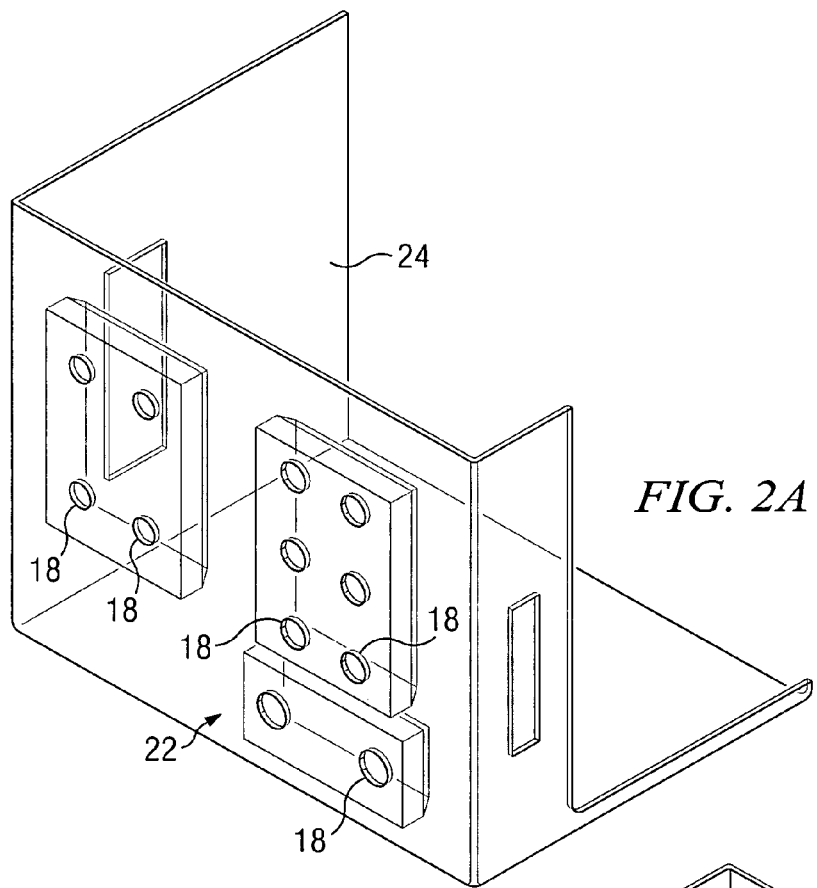
FIG. 2A is a perspective view of Rapid Prototyping High Density Circuitry (RPHDC) prototype junction box enclosure.
Figure 2B:
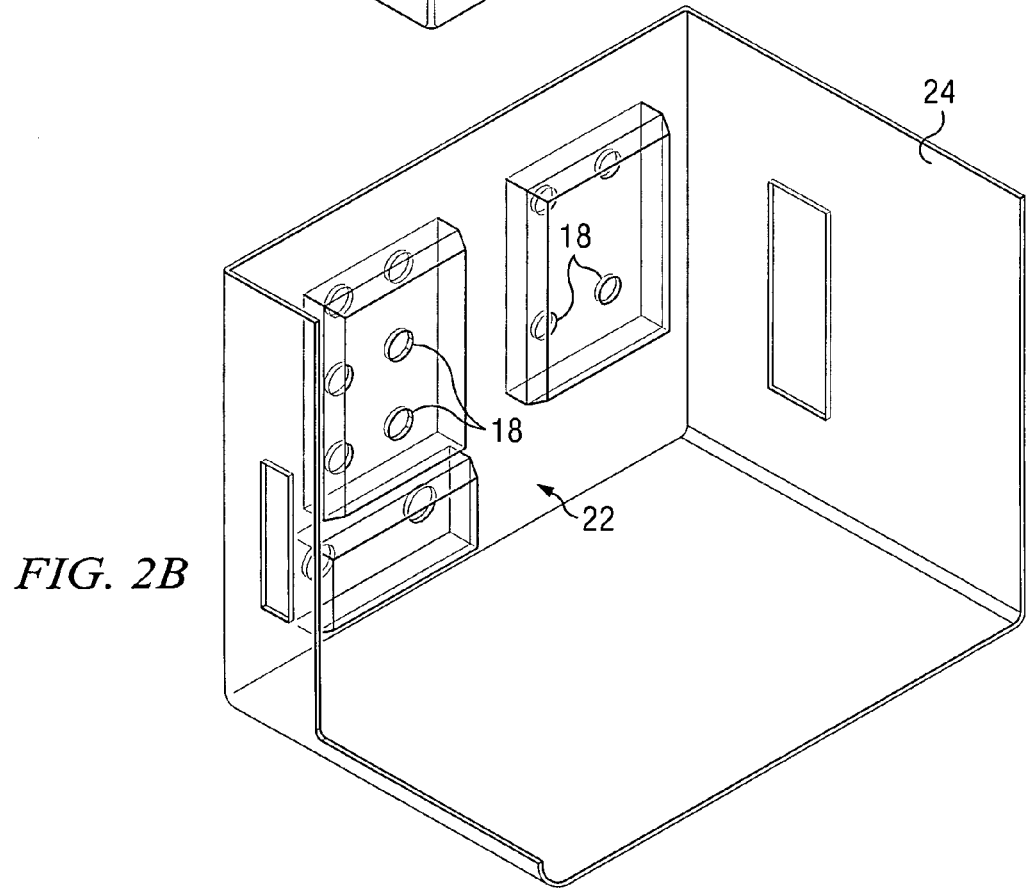
FIG. 2B is another perspective view of the RPHDC prototype junction box enclosure of FIG. 2A.

The prior art enclosure 10 depicted in FIGS. 1A and 1B was recreated using the RPHDC approach in accordance with the systems and methods of the present invention, as seen in FIGS. 2A and 2B. In order to recreate the sample enclosure 10 as accurately as possible, the dimensions or arrangement of the "dead front" user interface 20 or component cluster 22 of the prior art enclosure 10 were not altered and the input/output connectors 18 were not relocated from the sides. The connectors 18, joined by DW traces (later depicted), were encapsulated within the walls 22 of a SL resin enclosure 26. Additionally, current-carrying conductors 28 (later depicted) were insulated by resin encapsulation. To aid in component encapsulation, the enclosure 26 was designed with openings (not shown) to permit the laser (not shown) access to the back end of the connectors 18 in any preferred plane. Additional holes (not shown) may be included to aid in resin drainage and later capped before operation. Fillets and chamfers (not shown) may be added to the interior edges of the enclosure 26 to facilitate the DW process.

Figure 3A:
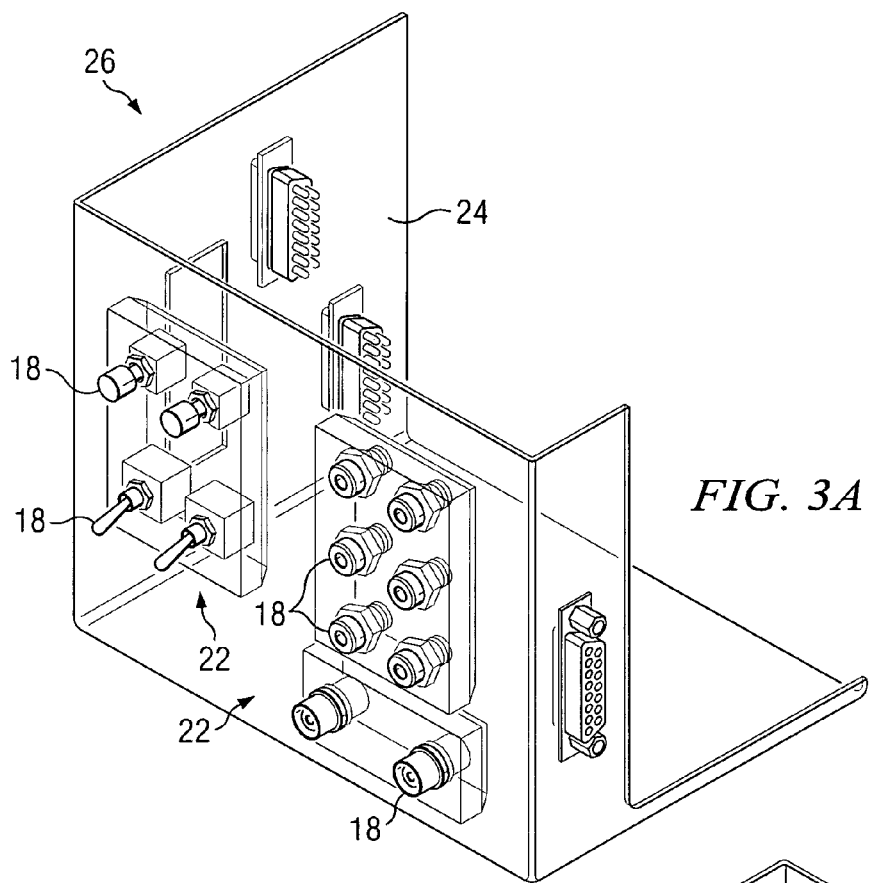
FIG. 3A is a perspective view of the RPHDC prototype junction box enclosure with pilot devices installed prior to encapsulation.
Figure 3B:
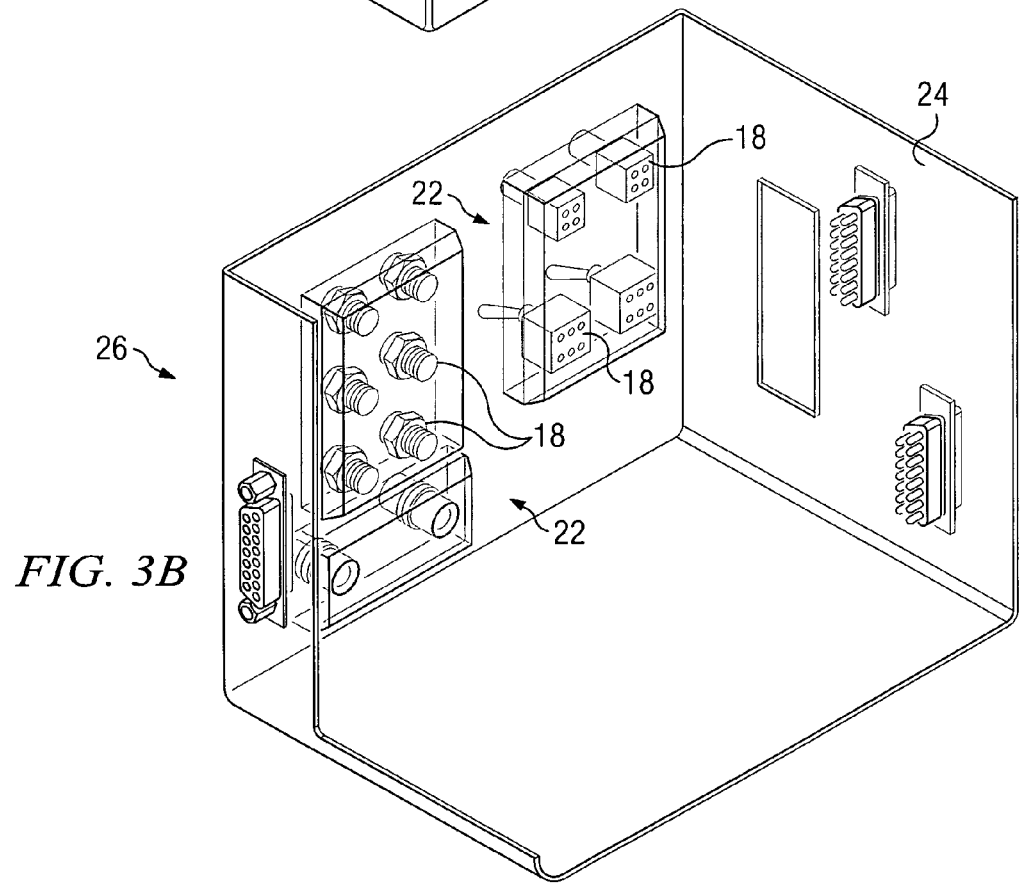
FIG. 3B is another perspective view of the RPHDC prototype junction box enclosure of FIG. 3A.
Figure 4:
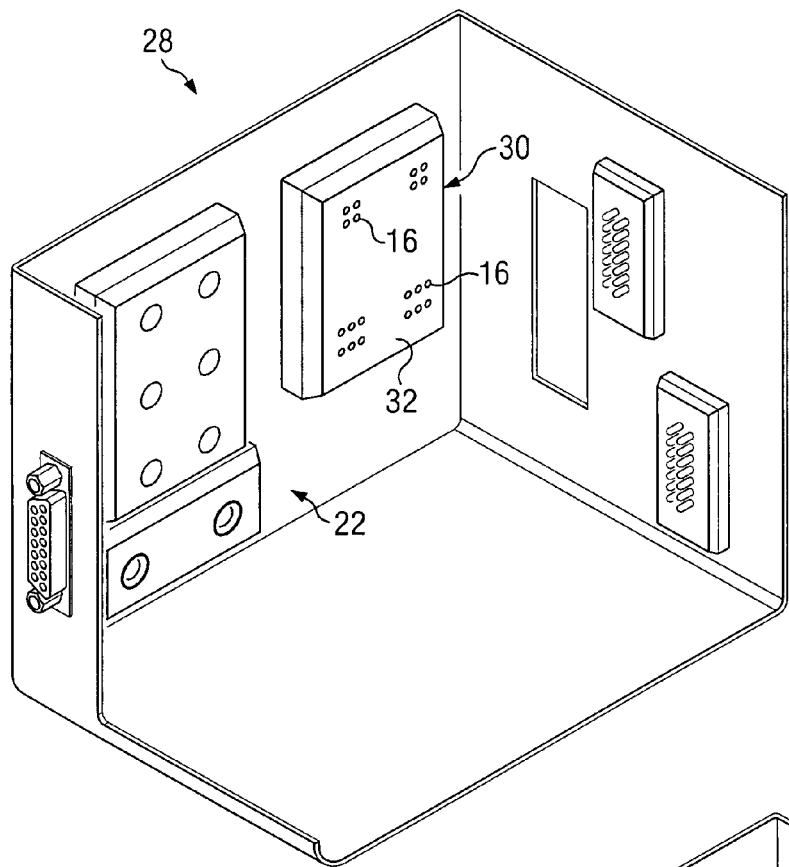
FIG. 4 is a perspective view of the RPHDC prototype junction box enclosure in a SL fixture during pilot device encapsulation.
Figure 5:
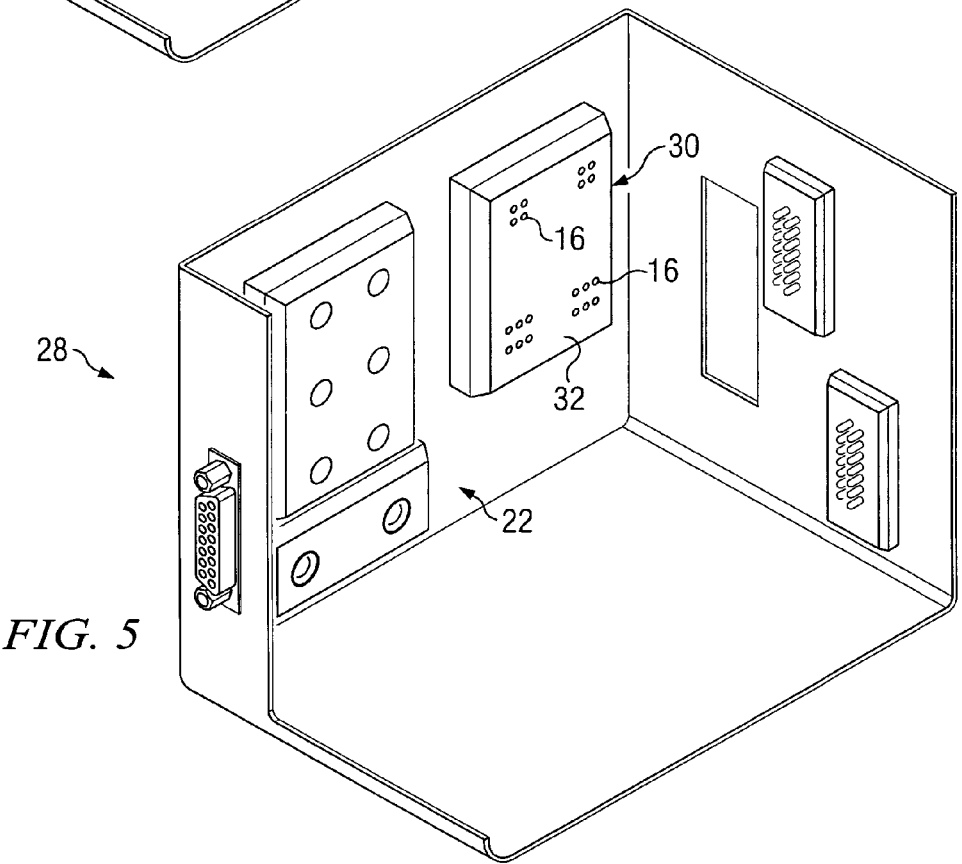
FIG. 5 is a perspective view of the RPHDC prototype junction box enclosure with encapsulated pilot devices.

The material used to make the enclosure 26 is not fully cured prior to encapsulation. The process continues with encapsulation and connectors 18 are installed in the enclosure 26 as depicted in FIGS. 3A and 3B. The height of the polygon bounding each component cluster 22 corresponds to the height of the connectors 18 as also depicted in FIGS. 3A and 3B. SL fixtures 30 are registered into the enclosure 26 in one of the three required orientations, as depicted in FIG. 4. The polygons of component clusters 22 are subsequently topped with a thin SL layer 32, for example of 500 micrometers thickness, to encapsulate the terminals 16 and provide a continuous surface for DW, as depicted in FIG. 5. The process is repeated for the remaining orientations.

Figure 6A:
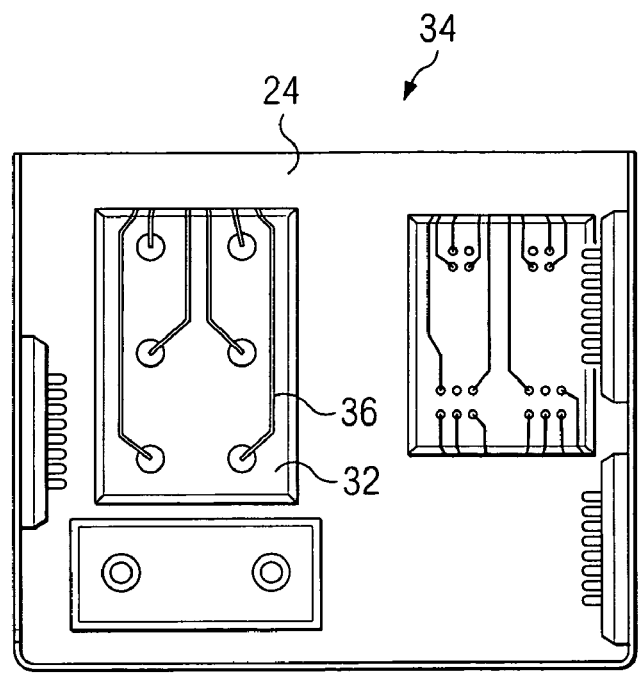
FIG. 6A is a rear view of the RPHDC prototype junction box enclosure with direct-write (DW) circuitry applied illustrating the complete test circuit.
Figure 6B:
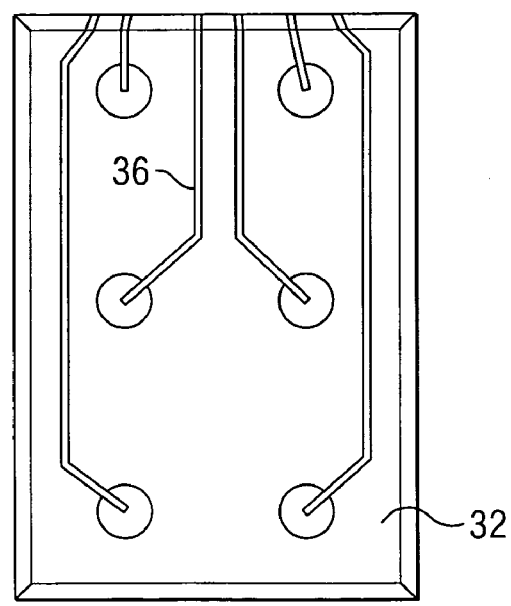
FIG. 6B is an enlarged view of the DW circuitry of FIG. 6A.

The resulting RPHDC prototype junction box 34 with DW circuitry is depicted in FIG. 6A. An enlarged view of the DW circuitry 36 is depicted in FIG. 6B. Thus, the methods and systems of a preferred embodiment integrates, for example, DW deposited conductive media with SL advantageously, reduces manufacturing labor and cycle time, maximizes space constraints, and reduces the size and weight of comparable products. Other examples of RPHDC redesigns which would miniaturize present day products are numerous but include, for example, the capability of manufacturing wallet-sized personal computers or multi-chip modules (MCMs) with 3D interconnects.

Several tests demonstrate the feasibility of RPHDC including addressing whether DW and SL are compatible. Initial material compatibility tests indicate favorable resin solidification and leeching effects for uncured materials. Even after depositing conductive inks into paths of varying width and depth, conductive signal strengths were strong. Thus, in accordance with a preferred embodiment, RP processes, such as SL, will support interrupted build processing and DW integration without raising material compatibility issues. Accordingly, a preferred embodiment enables RPHDC using a variety of fluid media or DW materials including, for example, inks, conductive inks, curable inks, curable media, conductive fluids, electronic inks, conductors, insulators, semi-conductive materials, magnetic materials, spin materials, piezoelectric materials, opto-electronic, thermoelectric materials, radio frequency materials, ultraviolet curable resins, controlled reaction materials, precursor fluids, metal-organic liquids, solutions, suspensions, sol-gels, nanoparticles, colloidal fluids, thermoplastics, extrudable materials, thermosets, 2-part epoxy materials and any combination thereof.

Other tests have focused on, for example, the software controls to register the parts and fixtures in the present inventions' building process, including repeatability and displacement tolerances. A preferred embodiment has demonstrated, for example, the build, stop, remove and re-register, cure and continue interrupted build processes described herein. The repeatability and displacement tests yielded tolerances within 0.0015 inches.

Still other tests have focused on structure integrity of fabricated parts and various mechanical properties of parts built with interrupted build processes. Using a control part made from an uninterrupted building process, parts built from variations of the interrupted build processes were tested specifically for any variances in tensile strength. All test results were within testing error. Thus, RP processes integrated with DW technologies demonstrate acceptable material compatibility issues and feasibility for interrupted build processing.

Although a preferred system and method for integrating thermally curable media during stereolithography is discussed in detail herein, it will be appreciated that the present invention provides many applicable inventive concepts that can be embodied in a wide variety of specific contexts. For example, while the description has principally referenced a prototype junction box enclosure, it is to be understood that the preferred embodiments disclosed herein may also be utilized for other applications such as electronic devices and embedded circuitry applications where such circuitry is hidden from view. It should also be understood that although the description has primarily focuses on SL, any RP process may be used. Similarly, although the description primarily focuses on DW technologies, other fluid dispensing technologies may also be used. The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. A method of rapid prototyping a part, the method comprising:
   fabricating a first part layer in a stereolithography apparatus;
   registering the first part layer on a direct-write apparatus;
   depositing a first trace of direct-write compatible media onto the first part layer;
   curing the first trace of direct-write compatible media deposited on the first part layer;
   registering the first part layer on the stereolithography apparatus; and
   fabricating a second part layer on top of the first part layer.

2. The method of claim 1 further comprising curing the first part layer, prior to depositing the direct-write compatible media.

3. The method of claim 1 further comprising creating an electrical interconnect.

4. The method of claim 1 further comprising building three-dimensional (3D) circuits.

5. The method of claim 1, wherein fabricating a second part layer includes encapsulating the direct-write compatible media.

6. The method of claim 1 further comprising:
registering the second part layer on the direct-write apparatus;
depositing a second trace of direct-write compatible media onto the second part layer such that the second trace and the first trace are operatively connected;
curing the second trace of direct-write compatible media;
registering the second part layer in the rapid prototyping apparatus; and
fabricating a third part layer on top of the second part layer.

7. The method of claim 1 further comprising inserting one or more pilot devices into the part.

8. The method of claim 1, wherein the step of curing is accomplished with a device selected from the group consisting of: a ultraviolet light source, a particle bombarder, a chemical sprayer, a radiation impinger, an ink jet, an oven, a fan, a pump, a curing device, a drying device that incorporates convection, conduction and/or radiation heat transfer and any combination thereof.

9. The method of claim 1, wherein the direct-write compatible media is selected from the group consisting of: inks, conductive inks, curable inks, curable media, conductive fluids, electronic inks, conductors, insulators, semi-conductive materials, magnetic materials, spin materials, piezoelectric materials, opto-electronic, thermoelectric materials, radio frequency materials, ultraviolet curable resins, controlled reaction materials, precursor fluids, metal-organic liquids, solutions, suspensions, sol-gels, nanoparticles, colloidal fluids, thermoplastics, extrudable materials, thermosets, 2-part epoxy materials and any combination thereof.

10. The method of claim 1, wherein the part layer is fabricated by a material selected from the group consisting of: a stereolithography resin, a radically polymerizable organic compound, a cationically polymerizable organic compound, a polyether, a polyol compound, an elastomer particle, a curable ink, a photopolymer resin, a photopolymer powdered material, a hydrogel and any combination thereof.

* * * * *